C. E. LLOYD.
FILM FEEDER FOR MOVING PICTURE MACHINES.
APPLICATION FILED APR. 21, 1911.
1,031,129.
Patented July 2, 1912.
2 SHEETS—SHEET 2.
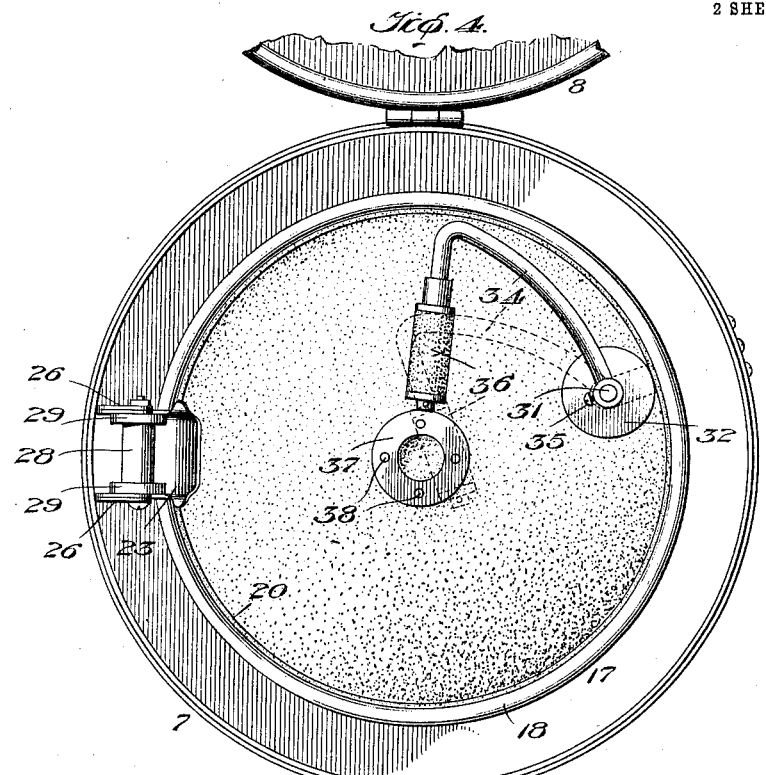
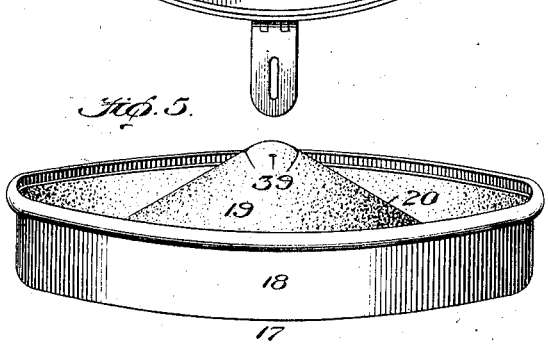
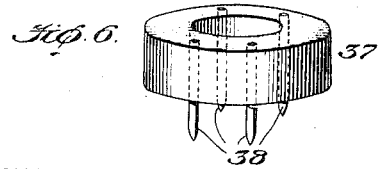
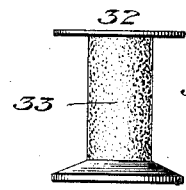
Witnesses
Inventor
Cecil E. Lloyd
By
his Attorney

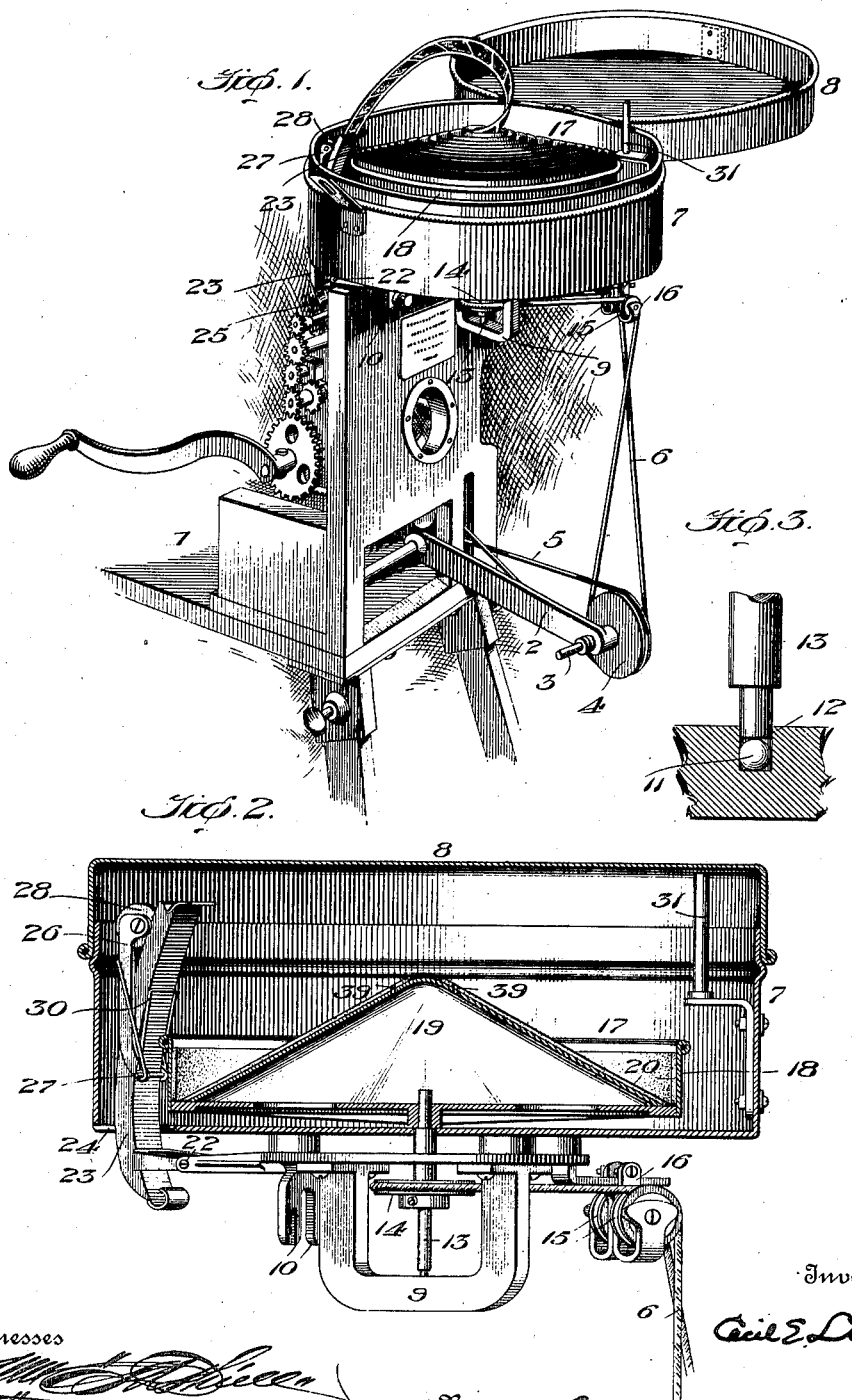

UNITED STATES PATENT OFFICE.

CECIL E. LLOYD, OF PENSACOLA, FLORIDA, ASSIGNOR TO ORVILLE E. SEARLE, OF PENSACOLA, FLORIDA.

FILM-FEEDER FOR MOVING-PICTURE MACHINES.

1,031,129.  Specification of Letters Patent.  Patented July 2, 1912.

Application filed April 21, 1911. Serial No. 622,590.

*To all whom it may concern:*

Be it known that I, CECIL E. LLOYD, a citizen of the United States, residing at Pensacola, county of Escambia, and State of Florida, have invented certain new and useful Improvements in Film-Feeders for Moving-Picture Machines, of which the following is a specification.

The present invention relates to film feeders for moving picture machines.

The films of moving picture machines after passing through the machine for exhibition purposes have to be re-wound so that when subsequently used the title will be first displayed and the pictures follow in their order. Much time is lost in re-winding films and special appliances are used for this purpose.

The present invention has for its object the provision of a novel film feeder, adapted for use on any moving picture machine, which will be adapted to receive and properly feed any film, whether its title is on the inner or the outer part of the previously wound film, so that it will pass to the moving picture with the title first and the pictures in their proper sequence, thereby obviating entirely the re-winding of films.

The present invention is susceptible of many modifications and I wish it understood that the disclosures hereinafter set forth and shown in the accompanying drawings are by way of illustration of the preferred form of the invention, but not in limitation of the scope thereof.

In the accompanying drawings:—Figure 1 is a perspective showing the invention applied to an ordinary moving picture machine; Fig. 2, an enlarged cross section through the present film feeder; Fig. 3, a detail of the step bearing for the rotary film support and feeder; Fig. 4, a plan view of the feeder showing certain attachments adapted for use when the title of the film is on the outer part thereof; Fig. 5, a perspective view of the film support and feeder; Fig. 6, a perspective detail of the center piece; and Fig. 7, a detail of the spool or pulley used for guiding the film when it is unwound or fed from the outer part of the film reel.

In the ordinary moving picture machine, the film, title first, is fed through the machine and wound onto a reel, which thus places the title on the innermost part of the film as it winds on the reel, necessitating re-winding of the film onto another reel before it is again exhibited.

In Fig. 1, I have shown a film whose title is on its inner or central part, illustrating how the necessity for re-winding is obviated as the film can be placed in my feeder and the inner title end immediately fed to any moving picture machine to which the device may be attached.

An ordinary moving picture machine is shown at 1 as provided with an outwardly extending arm 2 carrying a shaft 3 to which is fastened the usual pulley 4 driven by a belt 5.

My film feeder is driven from the shaft 3 by an elastic belt 6 passing around a pulley (not shown) provided with a set screw and secured on the moving shaft 3 of the moving picture machine and by reason of the employment of an elastic belt 6 which can stretch to different lengths, not only is the tension of the belt satisfactorily maintained, but the present film feeder is thus adapted for immediate attachment to any moving picture machine, regardless of the height of the latter. The primary object of the elastic belt, however, is to allow the necessary adjustment in framing the picture while in operation.

The shaft 3 carries any receiving reel whose side plates are separable or which will permit bodily removal of the film without unwinding it. The shaft 3 is driven by belt 5 from the operating mechanism of the moving picture machine in the usual manner, that is, with some slip-friction device to allow the receiving reel to run at a speed proportionate to the diameter of the film already wound thereon. The delivery reel is positively rotated by belt 6 from the shaft 3. When unwinding from the outer turn of the film on the delivery reel, the delivery reel may be allowed to run free instead of being positively driven. There should be substantially no slip in this drive; that is, the delivery reel should rotate at the same speed as the receiving reel, because the outer turn of the wound film has substantially the same diameter at all times as the inner turn of the film being unwound, when the film is unwound from the center. I claim no invention in the receiving reel, the mounting thereof, the means for driving it, or the means for driving the delivery reel from the receiving reel as such may be varied.

For the sake of conformity to fire underwriters' rules, the entire device is provided with a metal casing or shell 7 having a suitable cover 8 so that the film is inclosed, but I wish it understood that this shell or casing is not essential as all of the operative parts of the feeder may be supported by the frame 9. The frame 9 is provided with preferably two bifurcated ears or brackets 10 which are adapted to receive bolts or other fastenings for the rapid and easy connection of the feeder to the frame of the moving picture machine. The shell or casing, when used, is supported from and connected to the frame 9 in any preferred manner.

Stepped on a ball 11 (Fig. 3) and journaled in a bearing 12 in the upper part of the frame 9, is a spindle or shaft 13 which is provided with a pulley or sheave 14 around which the flexible belt 6 passes after passing over idlers 15 carried by a bracket 16 secured to the frame 9 so that, owing to the relative sizes of the different pulleys or sheaves, the shaft 13 is driven at the proper rate to cause the film to be uniformly fed through the machine without jerking or pulling.

Secured to and surmounting the shaft or spindle 13 is the film support or feeder 17, which consists of a circular tray 18 having a conical part 19, which may be formed in any preferred manner. Preferably, the inner wall of the tray 18 and the upper surface of the cone 19 are provided with felt, cloth, or any suitable friction facing 20 to enable these parts to the better frictionally engage and hold the film 21 (Fig. 1). The conical support for the film constitutes an important part of my invention as the film when pressed down thereupon or after being previously pressed upon a similar conical former and then pressed upon this cone and into the tray, is supported in such manner that either the outer or the inner end of the film may be readily unwound and fed without the slightest danger of tangling or interruption.

The film feeder consisting of the cone and the tray, being secured to the spindle 13, rotates at the proper rate to properly feed the film to the moving picture machine.

Pivoted at 22 to a part of frame 9 is a guide chute 23 which extends through a slot 24 up into the casing or shell 7 in proper position to receive the film, as shown in Fig. 1. From the lower end of this chute the film passes to the moving picture machine, as at 25, Fig. 1. To tension the film and cause it to lie flat in the chute, I provide a pair of arms 26 pivoted at 27 to the chute and carrying between their upper ends a roller or spool 28 whose heads 29 are adapted to bear against the bottom of the chute, the film passing underneath said roller. To maintain the roller in contact with the chute, a suitable spring 30 is provided. The entire chute being pivoted at 22 may be moved inwardly or outwardly in relation to the film support and feeder 17 so as to adapt the chute to the length of the film, films varying greatly in diameter when on a reel.

As before described, the device is adapted for handling the central part of a film reel which may be thus immediately fed into a moving picture machine without necessitating re-winding, but the invention is also adapted for feeding films from their outer part as will now appear.

Suitably supported by the shell 7 or the frame 9, as the case may be, is a pintle 31 on which, when necessary, a guide spool 32 such as shown in Figs. 4 and 7, may be slipped, said spool being free to turn on the pintle and being preferably provided with a friction facing 33. An arm (Fig. 4) which is provided with a set screw 35 is adapted to be slipped over the pintle 31 above the spool 32 so that it may be adjusted to a suitable position to bring a friction faced idler 36 carried thereby in such position that the film will pass thereover prior to being received in the chute 23. When the title of a film is outermost, the free end thereof will first be passed around the spool 32 and then up and over the idler 36 and finally into the chute 23. The arm 34 can be adjusted, as shown by dotted lines in Fig. 4, to suitably position the idler 36 in relation to the spool 32 so as to insure the correct feeding of the film.

By preference, I use the attachment shown in Figs. 4 and 6 when the title of the film is innermost, as shown in Fig. 1, said attachment consisting of a head or hub 37 provided with suitable attaching means 38 to engage holes 39 in the cone 19 and fitting in the central part of the film. This attachment serves as a guide for the film as it unwinds and assists in preventing any entanglement.

In applying a wound film to the present invention, the film may be first pressed down over a former of the same general conical shape as the cone 19 to press up the central part of the film, or, the film may be, without such prior treatment, immediately placed on the cone 19.

In operation, the rotation of the cone causes a positive unwinding and feed of the film, the convolutions of which are maintained in their proper relative arrangement owing to the shape of the cone and the tray, assisted by the friction facing and the guiding and tensioning devices.

Having thus described my invention, what I claim as new and desire to secure by Letters Patent, is:—

1. A film feeder having a conical support for the edge of the convolutions of a coiled film.

2. A film feeder having a rotary conical support for the edge of the convolutions of a coiled film.

3. A film feeder embodying a conical support for the edge of the convolutions of a coiled film and a circumscribing wall adapted to retain the coiled film.

4. A film support and feeder embodying a rotary cone adapted to support the edge of the convolutions of a coiled film and a circumscribing rotary wall therefor adapted to retain the coiled film.

5. A film support and feeder embodying an inner cone and an outer tray connected together and adapted for rotation.

6. A film feeder having a conical support for the edge of the convolutions of a coiled film provided with a friction facing adapted to engage the edge of the film.

7. A film feeder embodying a conical support for the edge of the convolutions of a coiled film and a circumscribing wall adapted to retain the coiled film, both provided with friction facing adapted respectively to engage the edge and outer part of the film.

8. In a film feeder for moving picture machines, the combination with a conical support for the edge of the convolutions of a coiled film, of means for taking off the film from the inner end thereof.

9. In a film feeder for moving picture machines, a film support adapted to hold the central part of the film in offset or displaced arrangement to facilitate the taking off of the film.

10. In a film feeder for moving picture machines, a film support adapted to hold the central part of the film in offset or displaced arrangement to facilitate the taking off of the film, in combination with a guide for said film.

11. In a film feeder for moving picture machines, a film support having means for holding the film in substantially conical arrangement with its central part offset from its general plane.

12. In a film feeder for moving picture machines, the combination with a film support having means for holding the film in substantially conical arrangement with its central part offset from its general plane, of a guide for the film.

13. The combination with a film support having means for holding the film in substantially conical arrangement, of a shiftable film guide movable in relation to said film support.

14. The combination with a film support, of a pivoted film guide shiftable in relation to said film support.

15. The combination with a rotary film support, of a pivoted film guide movable in relation thereto.

16. The combination with a rotary film support, of a pivoted film guide movable toward and away from the said film support to compensate for film reels of different diameters.

17. The combination with a film support, of a combined guide and tension for the film delivered from said film support.

18. The combination with a film support, of a chute or guide for the film and a spring-actuated tension roller adapted to bear on the film as it travels along said guide or chute.

19. The combination with a film support, of a spool disposed in relation thereto so as to be adapted to have the film pass therearound from the outer part of the film reel carried by the film support, and an adjustable idler adapted to support the film after passage around said spool.

In testimony whereof, I hereunto affix my signature in presence of two witnesses.

CECIL E. LLOYD.

Witnesses:
N. B. ETHERIDGE,
W. H. GRIFFIN.